(12) United States Patent
Lee

(10) Patent No.: US 9,733,829 B2
(45) Date of Patent: Aug. 15, 2017

(54) SET-TOP BOX ASSISTANT FOR TEXT INPUT METHOD AND DEVICE

(71) Applicant: HON HAI PRECISION INDUSTRY CO., LTD., New Taipei (TW)

(72) Inventor: Chih-Yao Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/141,848

(22) Filed: Apr. 29, 2016

(65) Prior Publication Data

US 2016/0370993 A1    Dec. 22, 2016

(30) Foreign Application Priority Data

Jun. 17, 2015    (TW) .................................. 104119516

(51) Int. Cl.
| | | |
|---|---|---|
| *H04N 5/445* | (2011.01) | |
| *G06F 3/0488* | (2013.01) | |
| *G06F 17/27* | (2006.01) | |
| *G06F 3/0484* | (2013.01) | |
| *G06F 3/0346* | (2013.01) | |

(Continued)

(52) U.S. Cl.
CPC ........ *G06F 3/04886* (2013.01); *G06F 3/0346* (2013.01); *G06F 3/04845* (2013.01); *G06F 17/276* (2013.01); *H04N 21/4131* (2013.01); *H04N 21/42212* (2013.01); *H04N 21/42222* (2013.01); *H04N 21/42224* (2013.01); *H04N 21/478* (2013.01); *H04N 21/482* (2013.01);

(Continued)

(58) Field of Classification Search
CPC ..................................................... H04N 21/475
See application file for complete search history.

(56) References Cited

U.S. PATENT DOCUMENTS

| | | | |
|---|---|---|---|
| 6,850,252 B1 * | 2/2005 | Hoffberg ............ | G06K 9/00369 348/E7.061 |
| 8,842,136 B2 * | 9/2014 | Kuo ...................... | G06F 3/0237 345/660 |

(Continued)

FOREIGN PATENT DOCUMENTS

| | | |
|---|---|---|
| CN | 102096552 A | 6/2011 |
| CN | 103813019 A | 5/2014 |

(Continued)

*Primary Examiner* — Pankaj Kumar
*Assistant Examiner* — Timothy Newlin
(74) *Attorney, Agent, or Firm* — Steven Reiss

(57) ABSTRACT

A text input method applied in a set-top box assistant comprises displaying a virtual keyboard on a TV display device, receiving a first input instruction, from a remote controller, decoding the first input instruction and inputting a first character, and performing a text searching operation in a text library according to the first character. Automatically selected and confirmable candidate characters are displayed on the virtual keyboard according to the search result. Movement of the remote controller is tracked, movement speed $V_1$ of a focus point of the remote controller on the virtual keyboard is calculated and whether movement speed is greater than a preset speed affects the recognition of commands by the assistant. Movement speed of the focus point can auto-move the focus point to a second character and the second character can be confirmed as input. A text input device is also disclosed.

8 Claims, 5 Drawing Sheets

| Defeat | Do | Does | | | | | | | |
|---|---|---|---|---|---|---|---|---|---|
| Q | W | E | R | T | Y | U | I | O | P |
| A | S | D | F | G | H | J | K | L | ; |
| Z | X | C | V | B | N | M | , | . | / |

(51) Int. Cl.
   *H04N 21/422*     (2011.01)
   *H04N 21/41*      (2011.01)
   *H04N 21/478*     (2011.01)
   *H04N 21/482*     (2011.01)

(52) U.S. Cl.
   CPC ............. *H04N 21/4828* (2013.01); *G06F 2203/04806* (2013.01)

(56) References Cited

U.S. PATENT DOCUMENTS

| | | | | |
|---|---|---|---|---|
| 2003/0038894 A1* | 2/2003 | Kim | ............... | H04N 5/44543 348/569 |
| 2009/0213079 A1* | 8/2009 | Segal | ............... | G06F 3/0231 345/169 |
| 2009/0295719 A1* | 12/2009 | Choi | ............... | H04N 5/4403 345/158 |
| 2010/0141578 A1* | 6/2010 | Horiuchi | ............... | G06F 3/017 345/158 |
| 2010/0306800 A1* | 12/2010 | Jung | ............... | H04N 1/00448 725/41 |
| 2011/0072477 A1* | 3/2011 | Foti | ............... | H04L 12/1813 725/105 |
| 2012/0013538 A1* | 1/2012 | Yu | ............... | G06F 3/04886 345/171 |
| 2012/0229320 A1* | 9/2012 | Yu | ............... | H04N 21/42218 341/176 |
| 2013/0086504 A1* | 4/2013 | Venkateswaran | ... | G06F 3/04886 715/773 |
| 2013/0291015 A1* | 10/2013 | Pan | ............... | H04N 5/4403 725/37 |
| 2013/0328770 A1* | 12/2013 | Parham | ............... | G06F 3/0304 345/157 |
| 2014/0043542 A1* | 2/2014 | Wang | ............... | H04N 5/4403 348/734 |
| 2014/0132524 A1* | 5/2014 | Lee | ............... | G06F 3/044 345/173 |
| 2016/0044382 A1* | 2/2016 | Seo | ............... | H04N 21/4858 725/43 |
| 2016/0345048 A1* | 11/2016 | Kim | ............... | H04N 21/6125 |

FOREIGN PATENT DOCUMENTS

| | | |
|---|---|---|
| TW | I341484 B | 5/2011 |
| TW | I430651 B | 3/2014 |

\* cited by examiner

| Defeat | Do | Does | | | | | | | |
|--------|-----|------|---|---|---|---|---|---|---|
| Q | W | E | R | T | Y | U | I | O | P |
| A | S | D | F | G | H | J | K | L | ; |
| Z | X | C | V | B | N | M | , | . | / |

FIG. 2

|   | W | E | R |   |   |   |   |   |   |
|---|---|---|---|---|---|---|---|---|---|
|   |   |   |   | T | Y | U | I | O | P |
|   | S | D | F | G | H | J | K | L | ; |
|   | X | C | V | B | N | M | , | . | / |

FIG. 3

SET-TOP BOX ASSISTANT FOR TEXT INPUT METHOD AND DEVICE

FIELD

The subject matter herein generally relates to commands by text input for household appliances.

BACKGROUND

With development of digital televisions (TVs) and interactive applications for digital TVs, commands input by text to the TV is widely applied. A keypad of a TV remote controller is generally composed of figure keys, directional keys, and other functional keys. Traditionally, users have to input text on a TV by repeatedly pressing the direction keys and the functional keys, which is time-consuming and compromises user experience.

BRIEF DESCRIPTION OF THE DRAWINGS

Implementations of the present technology will now be described, by way of example only, with reference to the attached figures.

FIG. 2 illustrates a diagrammatic view of an embodiment of candidate characters for an input character in the text input system of FIG. 1.

FIG. 3 illustrates a schematic diagram of a text search on a virtual keyboard in the text input system of FIG. 1.

DETAILED DESCRIPTION

Figure 1:
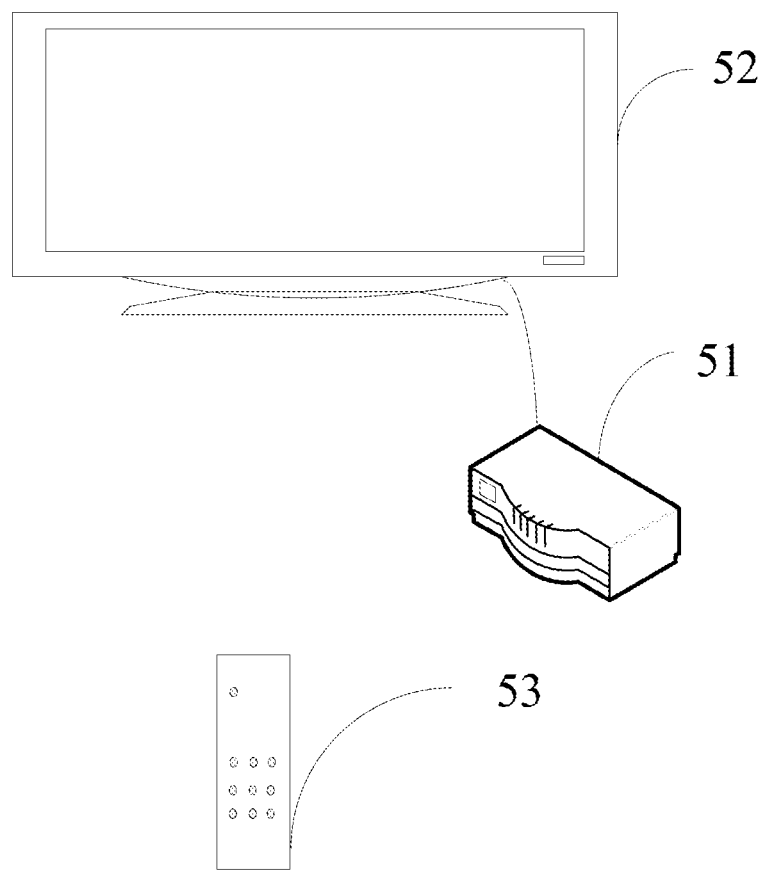
FIG. 1 illustrates a diagrammatic view of an application environment of a text input system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

It should be noted that references to "an" or "one" embodiment in this disclosure are not necessarily to the same embodiment, and such references mean "at least one."

In general, the text "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 illustrates an application environment of a text input system 10. In this embodiment, a remote controller 53 which may be held in the hand is utilized to input instructions. A set-top box 51 receives, decodes, and executes the instructions, and includes a receiving module 100, a decoding module 200, a text library module 300, a text search module 400, an interface module 500, a calculation module 700, a determining module 800, and an input module 900. A TV 52 displays an input interface and a virtual keyboard.

Figure 4:
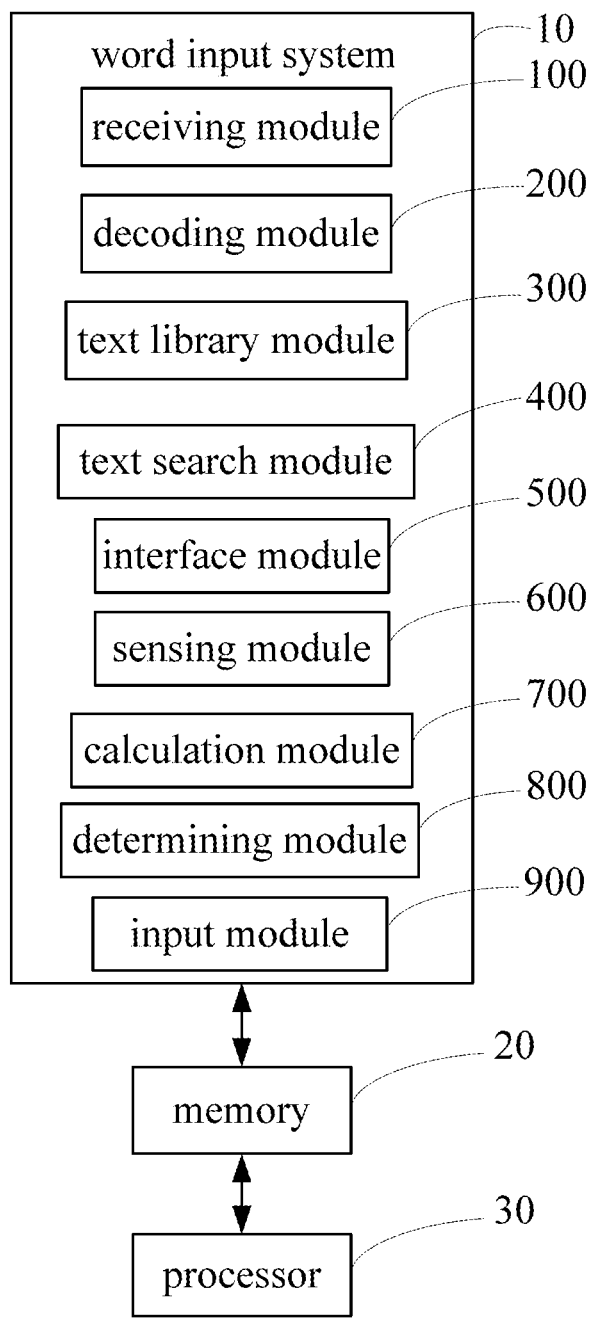
FIG. 4 illustrates a block diagram of one embodiment of functional modules of the text input system of FIG. 1.

FIG. 4 illustrates one embodiment of functional modules of a text input system 10 in the set-top box 51. The text input system 10 includes a receiving module 100, a decoding module 200, a text library module 300, a text search module 400, an interface module 500, a sensing module 600, a calculation module 700, a determining module 800, and an input module 900. The modules are configured to be executed by one or more processors to perform their respective functions. In this embodiment, the modules are executed by a processor 30. Each module of the present disclosure is a computer program for a specific function. A memory 20 stores the program code and other information of the text input system 10.

The receiving module 100 receives instructions from the remote controller 53. The instructions include (but are not limited to) activating, switching, and terminating the text input method, the determination of text input, the deletion of text input, and others.

The decoding module 200 decodes instructions from the remote controller 53. For example, when the received instruction is decoded as "activation", then the text input method is activated. When the received instruction is decoded as "switch", then the text input method is switched. When the received instruction is decoded as "input", the decoded instruction is sent to the text search module 400.

The text library module 300 stores at least one text library. The text library module 300 may provide multiple text libraries, such as an English library, a Pinyin library, a Five Keystrokes library, and others.

The text search module 400 searches for a character(s) in a text library according to a first character. The text search module 400 searches for the character(s) associated with the first character according to use frequency, and highlights second characters that are associated with the highest frequency of the characters on the virtual keyboard. Referring to FIG. 2, for example, when the user inputs a character "D", the text search module 400 automatically searches for and then highlights as second characters "E", "Y", "I", "O." Candidate texts, for example, "Defeat", "Do", and "Does" are then displayed at the region of the virtual keyboard.

Figure 3:
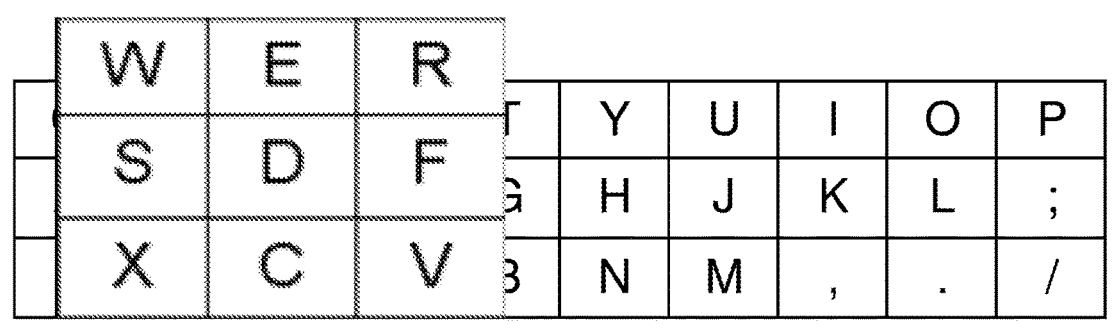

Referring to FIG. 3, the interface module 500 displays the virtual keyboard on a display device, for example, the TV 52, and candidate characters on the virtual keyboard. When a second virtual key corresponding to the second character is located near a first virtual key corresponding to the first character, a predefined area is enlarged by M*N grids where the first character is located. Moving a focus point of the remote controller on the virtual keyboard and select a desired character, for example, the first character, is thus convenient.

The sensing module 600 detects the movement or track of the remote controller 53. A sensing module is installed in the remote controller 53. When a text input is required by the remote controller 53, the focus point of the remote controller 53 is moved to the second virtual key. The remote controller 53 can be moved up, down, left, or right directions.

The calculation module 700 calculates a movement speed $V_1$ of the focus point on the virtual keyboard, and calculates a distance $d_1$ between the first virtual key and the second virtual key from the candidate characters.

The determining module 800 determines whether the movement speed $V_1$ is greater than a preset speed V. When the movement speed $V_1$ greater than the preset speed V, the remote controller 53 auto-moves the focus point within the candidate characters, from the first virtual key to the second virtual key, wherein the distance between the first virtual key and the second virtual key is not greater than the preset distance d. For example, the focus point of the remote controller points at the grid where the character "W" is located, the distance $d_1$ extends from the first character "W" to the second character "E" among the associated characters "E", "Y", "I", and "O" is the shortest. When the distance $d_1$ is less than or equal to the preset distance d, the focus point of the remote controller moves from the character "W" to the character "E" automatically.

The preset speed $V=((P_2-P_1)*C_2*s/r)/t$ and the preset distance $d=C_1*s/r$. $P_1$ is a starting point of the focus point with respect to the movement track of the remote controller, $P_2$ is an ending point of the focus point with respect to the movement track of the remote controller, $C_1$ and $C_2$ are constants, s stands for a size of the display device, r denotes a resolution radio set by the set-top box, and t denotes a period of time for the focus point moving from the point $P_1$ to the point $P_2$ on the display device.

The input module 900 inputs a character on which the focus point of the remote controller is located. When such a character is the desired character, for example, is the correct second character, the input module 900 inputs the actual character, and displays the character on the display device.

Figure 5:
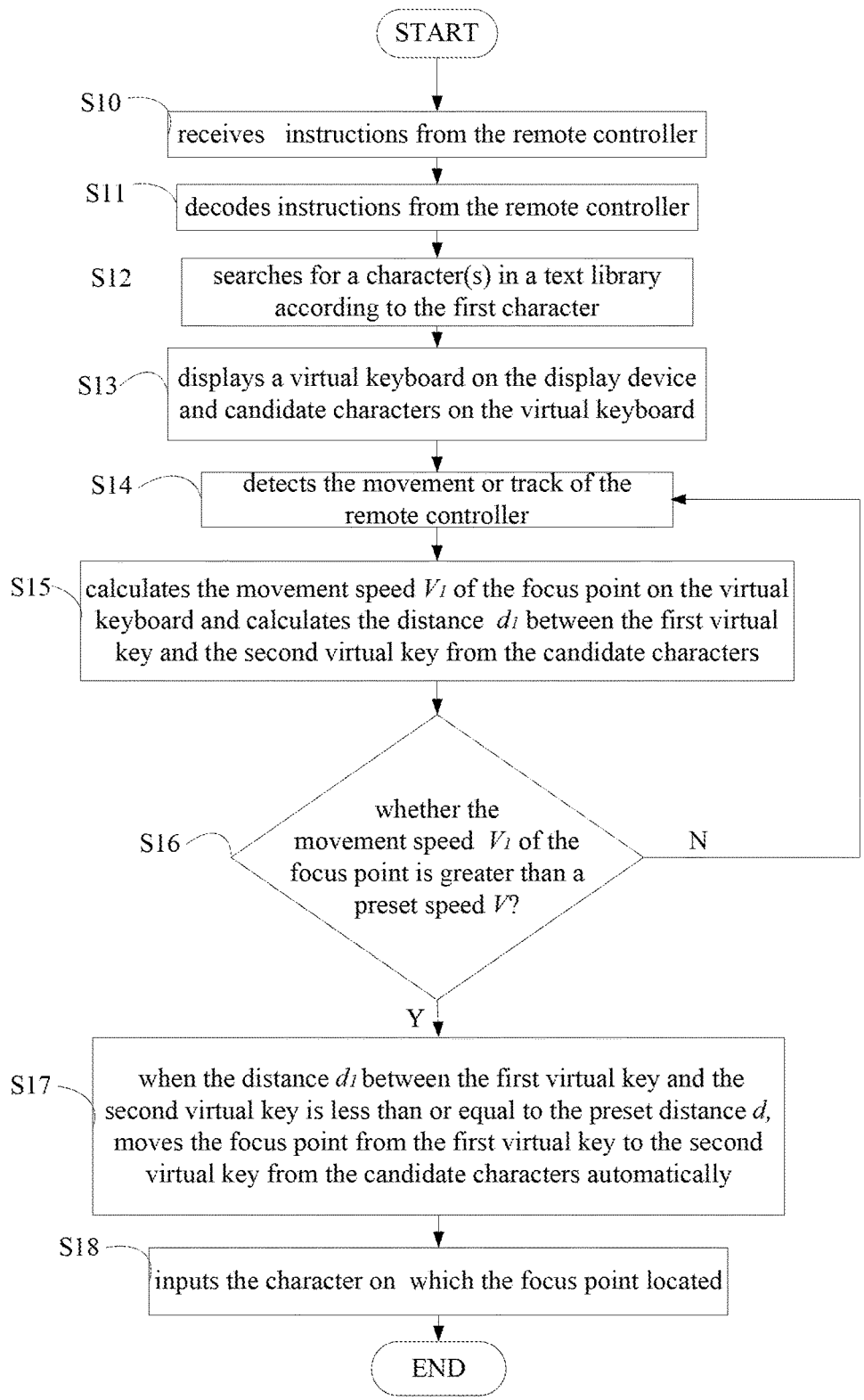
FIG. 5 illustrates a flowchart of one embodiment of a text input method for the text input system of FIG. 1.

FIG. 5 illustrates a flowchart of one embodiment of a text input method. The text input method is operable to be executed in a device communicating with a remote controller (hereinafter "communicating device"), the processor 30 executing program codes stored in the memory 20.

At block 10, the device receives instructions from the remote controller 53. The instructions include (but are not limited to) activating, switching, and terminating the text input method, the determination of text input, the deletion of text input, and others.

At block 11, the device decodes instructions from the remote controller. For example, when the received instruction is decoded as "activation", then the text input method is activated. When the received instruction is decoded as "switch", then the text input method is switched. When the received instruction is decoded as "input", the decoded instruction is sent to the text search module 400.

At block 12, the device searches for a character(s) in a text library according to the first character. The text search module 400 searches for the character(s) associated with the first character according to use frequency, and highlights second characters that are associated with the highest frequency of the characters on the virtual keyboard. Referring to FIG. 2, for example, when the user inputs a character "D", the text search module 400 automatically searches for and then highlights as second characters "E", "Y", "I", "O". Candidate texts, for example, "Defeat", "Do" and "Does" are then displayed at the region of the virtual keyboard.

At block 13, the device displays the virtual keyboard on a display device, for example, the TV 52, and candidate characters on the virtual keyboard. When a second virtual key corresponding to the second character is located near a first virtual key corresponding to the first character, a predefined area enlarged by M*N grids where the first character is located. Moving the focus point of the remote controller on the virtual keyboard and select the desired character, for example, the first character, is thus convenient.

At block 14, the device detects the movement or track of the remote controller 53. A sensing module is installed in the remote controller 53. When a text input is required by the remote controller 53, the focus point of the remote controller 53 is moved to the second virtual key. The remote controller 53 can be moved up, down, left, or right directions.

At block 15, the device calculates the movement speed $V_1$ of the focus point on the virtual keyboard, and calculates the distance $d_1$ between the first virtual key and the second virtual key from the candidate characters.

At block 16, the device determines whether the movement speed $V_1$ is greater than a preset speed V. When the movement speed $V_1$ is greater than the preset speed V, execute the block 17, if not, execute the block 14.

At block 17, when the distance $d_1$ between the first virtual key and the second virtual key is less than or equal to the preset distance d, the device moves the focus point within the candidate characters, from the first virtual key to the second virtual key automatically. For example, the focus point of the remote controller points at the grid where the character "W" is located, and the distance $d_1$ extends from the first character "W" to the second character "E" among the associated characters "E", "Y", "I" and "O" is the shortest. When $d_1$ is less than or equal to the preset distance d, the focus point of the remote controller moves from the character "W" to the character "E" automatically.

The preset speed $V=((P_2-P_1)*C_2*s/r)/t$ and the preset distance $d=C_1*s/r$. $P_1$ is the starting point of the focus point with respect to the movement track of the remote controller, $P_2$ is the ending point of the focus point with respect to the movement track of the remote controller, $C_1$ and $C_2$ are constants, s stands for the size of the display device, r denotes the resolution radio set by the set-top box, and t denotes the period of time for the focus point moving from the point $P_1$ to the point $P_2$ on the display device.

At block 18, the device inputs the character on which the focus point is located. When such a character is the desired character, for example, is the correct second character, the device inputs the actual character, and displays the character on the display device.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A text input method operable to be executed in a set-top box communicating with a remote controller, the method comprising:
   displaying a virtual keyboard on a display device connecting to the set-top box;
   receiving a first input instruction from the remote controller;

decoding the first input instruction and inputting a first character via a first virtual key of the virtual keyboard on the display device according to the first input instruction;

performing a text searching operation to a text library according to the first character;

displaying candidate characters on the virtual keyboard according to the search result;

detecting a movement track of the remote controller;

calculating a movement speed $V_1$ of a focus point of the remote controller on the virtual keyboard;

determining whether the movement speed $V_1$ is greater than a preset speed V;

when the movement speed $V_1$ is greater than the preset speed V, moving the focus point from the first virtual key corresponding to the first character to a second virtual key corresponding to a second character from the candidate characters, wherein a distance between the first virtual key and the second virtual key is not greater than a preset distance d; and inputting the second character on which the focus point is located via the second virtual key.

2. The text input method as claimed in claim 1, wherein the searching step further comprises:

generating separate candidate characters associated with the first character by searching the text library according to use frequency of texts.

3. The text input method as claimed in claim 1, wherein the step of displaying the virtual keyboard on a display device further comprises:

pressing a button to trigger an enlargement function to enlarge a predefined area with M*N grids where the first character is located and releasing the button to input the first character.

4. The text input method as claimed in claim 1, wherein the preset speed $V=((P_2-P_1)*C_2*s/r)/t$, the preset distance $d=C_1*s/r$, $P_1$ is a starting point of the focus point with respect to the movement track of the remote controller, $P_2$ is an ending point of the focus point with respect to the movement track of the remote controller, $C_1$ and $C_2$ are constants, s stands for a size of the display device, r denotes a resolution ratio set by the set-top box, and t denotes a period that the focus point moves from the point $P_1$ to the point $P_2$.

5. A text input device, comprising:

at least one processor;

a non-transitory storage system coupled to the at least one processor and configured to store one or more programs configured to be executed by the at least one processor, the one or more programs comprise instructions for:

displaying a virtual keyboard on a display device connecting to a set-top box;

receiving a first input instruction from a remote controller;

decoding the first input instruction and inputting a first character via a first virtual key of the virtual keyboard on the display device according to the first input instruction;

performing a text searching operation to a text library according to the first character;

displaying candidate characters on the virtual keyboard according to the search result;

detecting a movement track of the remote controller;

calculating a movement speed $V_1$ of a focus point of the remote controller on the virtual keyboard;

determining whether the movement speed $V_1$ of the focus point is greater than a preset speed V;

when the movement speed $V_1$ is greater than the preset speed V, moving the focus point from the first virtual key corresponding to the first character to a second virtual key corresponding to a second character from the candidate characters wherein a distance between the first virtual key and the second virtual key is not greater than a preset distance d; and inputting the second character on which the focus point is located via the second virtual key.

6. The text input device as claimed in claim 5, wherein the one or more programs further comprise instructions for:

generating separate candidate characters associated with the first character by searching the text library according to use frequency of texts.

7. The text input device as claimed in claim 5, wherein the one or more programs further comprise instructions for:

pressing a button to trigger an enlargement function to enlarge a predefine area with M*N grids where the first character is located and releasing the button to input the first character.

8. The text input device as claimed in claim 6, wherein the preset speed $V=((P_2-P_1)*C_2*s/r)/t$, and the preset distance $d=C_1*s/r$, $P_1$ is a starting point of the focus point with respect to the movement track the remote controller, $P_2$ is an ending point of the focus point with respect to the movement track of the remote controller, $C_1$ and $C_2$ are constants, s stands for a size of the display device, r denotes a resolution radio set by the set-top box, and t denotes a period that the focus point moves from the point $P_1$ to the point $P_2$.

* * * * *